United States Patent
Colton et al.

(10) Patent No.: US 8,156,698 B2
(45) Date of Patent: Apr. 17, 2012

(54) BLAST-RESISTANT WINDOW SCREEN SYSTEM

(75) Inventors: James D. Colton, Palo Alto, CA (US); Gary R. Greenfield, San Jose, CA (US); Paul Zuanich, Redwood City, CA (US)

(73) Assignee: SRI International, Menlo Park, CA (US)

( * ) Notice: Subject to any disclaimer, the term of this patent is extended or adjusted under 35 U.S.C. 154(b) by 1450 days.

(21) Appl. No.: 11/656,348

(22) Filed: Jan. 19, 2007

(65) Prior Publication Data

US 2010/0272928 A1    Oct. 28, 2010

Related U.S. Application Data

(63) Continuation-in-part of application No. 11/471,806, filed on Jun. 20, 2006, now abandoned.

(60) Provisional application No. 60/693,024, filed on Jun. 22, 2005.

(51) Int. Cl.
*E06B 5/10* (2006.01)

(52) U.S. Cl. ........ 52/202; 428/911; 89/36.02; 89/36.04; 442/134; 442/135

(58) Field of Classification Search .................. 52/202; 428/911; 89/36.02, 36.04; 442/134, 135
See application file for complete search history.

(56) References Cited

U.S. PATENT DOCUMENTS

| | | | | |
|---|---|---|---|---|
| 4,081,581 | A | * | 3/1978 | Littell, Jr. ................... 52/786.12 |
| 5,353,858 | A | * | 10/1994 | Hartmann ..................... 160/264 |
| 5,915,449 | A | | 6/1999 | Schwartz |
| 5,939,658 | A | * | 8/1999 | Muller .......................... 89/36.04 |
| 6,010,758 | A | | 1/2000 | Anglin, Jr. |
| 6,057,029 | A | * | 5/2000 | Demestre et al. ............. 428/911 |
| 6,612,217 | B1 | | 9/2003 | Shockey et al. |
| 6,612,840 | B1 | | 9/2003 | Turner |

* cited by examiner

*Primary Examiner* — Basil Katcheves
*Assistant Examiner* — Matthew J Smith
(74) *Attorney, Agent, or Firm* — Lumen Patent Firm

(57) ABSTRACT

The present invention provides a system for window blast protection. The system includes a first material, which is either elastomeric or non-elastomeric, which is bonded to a second material, which is elastomeric when the first material is non-elastomeric, and is non-elastomeric when the first material is elastomeric. The system also includes a cover for protecting the materials, where the cover releases the materials in response to the pressure impact of an explosive blast. The second material is anchored to the inside of the cover. When the system is in use, the system further includes a bonding agent for bonding the first material to a film attached to the inner surface of the window and an anchoring means for anchoring the outside of the cover to a frame or wall surrounding the window.

17 Claims, 7 Drawing Sheets

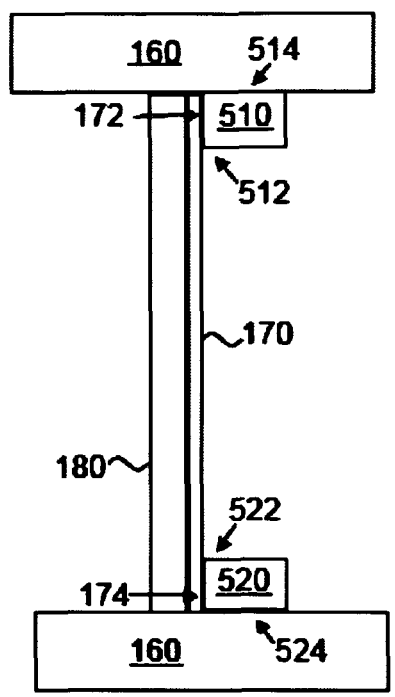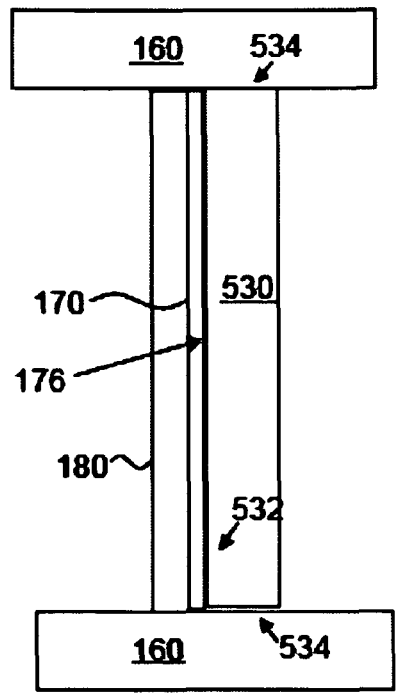

BLAST-RESISTANT WINDOW SCREEN SYSTEM

CROSS-REFERENCE TO RELATED APPLICATIONS

This application is a continuation-in-part of U.S. patent application Ser. No. 11/471,806, filed Jun. 20, 2006 now abandoned, which claims priority from U.S. Provisional Patent Application No. 60/693,024, filed Jun. 22, 2005, both of which are incorporated herein by reference.

FIELD OF THE INVENTION

The present invention relates generally to blast protection. More particularly, the present invention relates to a blast-resistant window screen system.

BACKGROUND

When a large terrorist bomb is detonated near a building, flying glass from blown-out windows causes the most injuries. There is a clear need to harden windows in many government buildings to terrorist blast. The General Services Administration (GSA) plans to harden 800 existing government buildings over the next several years. Many new government buildings will also be glass hardened to blast. Depending on the perceived threat, GSA requirements are to protect about half the hardened windows against blasts of 4 psi and the other half against 10 psi.

Several window-hardening systems have been developed to eliminate or minimize the threat of injury from glass fragments produced by terrorist bombs. For new building construction, the typical approach is to use extra-thick glass (up to one inch) or to use strong ductile polymers such as Lexan. Retrofitting existing buildings with these approaches is often prohibitively expensive and, therefore, other approaches are used.

Current retrofit systems for hardening windows involve adding a film or curtain on the inside of the window to prevent the glass from flying into the room. The simplest retrofit system is to cover the inside of the window with polyester film over the portion of the glass inside the frame (so-called daylight film). Such films are already frequently used to limit ultraviolet light transmitted through the window. A blast wave impinging on glass covered with daylight film will still fracture the glass but, up to a limit, the film will adhere to the glass fragments. Furthermore, the film/glass structure raises the blast hardness compared to a bare window.

To further increase the blast hardness, the film may be anchored to the window using a variety of materials. Hardness can also be increased by a so-called horizontal catch bar mounted at the mid-height of the window. In this system, the film, with glass fragments still attached, is arrested by the catch bar as the film folds around it.

Current systems are insufficient for many applications because they concentrate the stress at the edge or at the middle of the film, thus limiting the blast pressure the film can withstand before it fails. Accordingly, there is a need in the art to develop a window-hardening method that relieves the stress on the film, has the flexibility to provide a range of hardness levels up to at least 10 psi, and is simple and inexpensive to install.

SUMMARY OF THE INVENTION

The present invention provides a system for window blast protection. The system includes a first material, having first and second ends, that is either elastomeric or non-elastomeric. The system also includes a second material, having first and second ends, that is elastomeric when the first material is non-elastomeric, and is non-elastomeric when the first material is elastomeric. The first material is bonded along its second end to the first end of the second material. Thus, the system contains two materials that are bonded to one another, a non-elastomeric material for containing glass fragments generated by the blast and an elastomeric material for absorbing energy from the blast. The system also includes a cover for protecting the first and second materials, where the cover releases the first and second materials in response to the pressure impact of an explosive blast. The second material is anchored along its second end to the inside of the cover. When the system is in use, the system further includes a bonding agent for bonding the first material along its first end to a film attached to the inner surface of the window. In addition, the system includes a means for anchoring the outside of the cover to a frame or wall surrounding the window.

In a preferred embodiment, the system also includes a third material, having first and second ends, where the third material is non-elastomeric. Preferably, the third material is a mesh, and thus serves to both vent blast pressure and contain glass fragments generated by the blast pressure impact. Preferably, the third material is anchored along its second end to the inside of the cover. Also preferably, an edge of the first or second non-elastomeric material is bonded to an edge of the third material. When the system is in use, the system further includes a bonding agent to bond the third material along its first end to the film attached to the inner surface of the window.

In a particularly preferred embodiment, the system is divided into a top section, a bottom section, and two side sections. The top section is designed to bind at one edge to a top border of the window film, the bottom section is designed to bind at one edge to a bottom border of the window film, and each of the side sections are designed to bind at one edge to a side border of the window film. Another edge of the top, bottom, and two side sections is designed to be anchored to the frame or wall surrounding the window. Preferably, the top and bottom sections contain the third material, and the two side sections contain the first and second materials. In an alternative embodiment, the placement of the panels can be rotated 90° such that the panels described above as being at the top and bottom are now at the sides and the panels identified as the sides are now positioned at the top and bottom of the window restraint system.

BRIEF DESCRIPTION OF THE FIGURES

The present invention together with its objectives and advantages will be understood by reading the following description in conjunction with the drawings, in which:

FIG. 5 shows an example of sections of a system according to the present invention.

DETAILED DESCRIPTION OF THE INVENTION

Figure 1A:
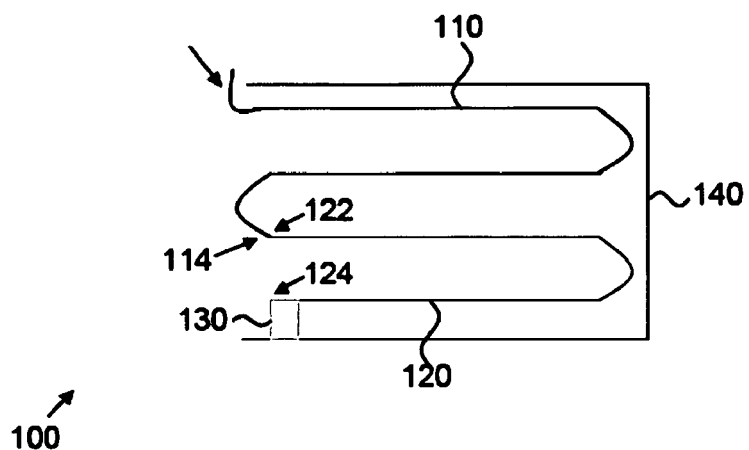
FIG. 1 shows an embodiment of a system according to the present invention.

FIG. 1A shows an example of a blast-resistant window system 100 according to the present invention. The system 100 includes a first material 110, with first end 112 and second end 114, and a second material 120, with first end 122 and second end 124. First material 110 is either elastomeric or non-elastomeric. Second material 120 is elastomeric when first material 110 is non-elastomeric, and is non-elastomeric when first material 110 is elastomeric. In a preferred embodiment, first material 110 is non-elastomeric, and second material 120 is elastomeric. First material 110 is bonded at second end 114 to first end 122 of second material 120. Second material 120 is anchored at its second end 124 to the inside of cover 140 through anchoring means 130. The anchoring means may a bonding agent, screw-like fasteners with or without reinforcing means, or a combination thereof. If anchoring means 130 is a bonding agent, it may be any bonding agent known in the art, including but not limited to glue and Velcro. First material 110 may be bonded to second material 120 using any method known in the art, including but not limited to sewing, gluing, or gluing and sewing. Preferably materials 110 and 120 are folded, rolled, or coiled within cover 140 for compactness.

The non-elastomeric material may be any non-elastomeric material known in the art, including but not limited to a synthetic fiber, such as rayon or nylon. Similarly, the elastomeric material may be any elastomeric material known in the art, including but not limited to nitrile, butyl, epichlorohydrin, hypalon, latex, natural rubber, neoprene, polyurethane, pure gum rubber, styrene butadiene, santoprene, vinyl or viton. The elastomeric material preferably contains slits to reduce the effective thickness of the material.

Figure 1B:
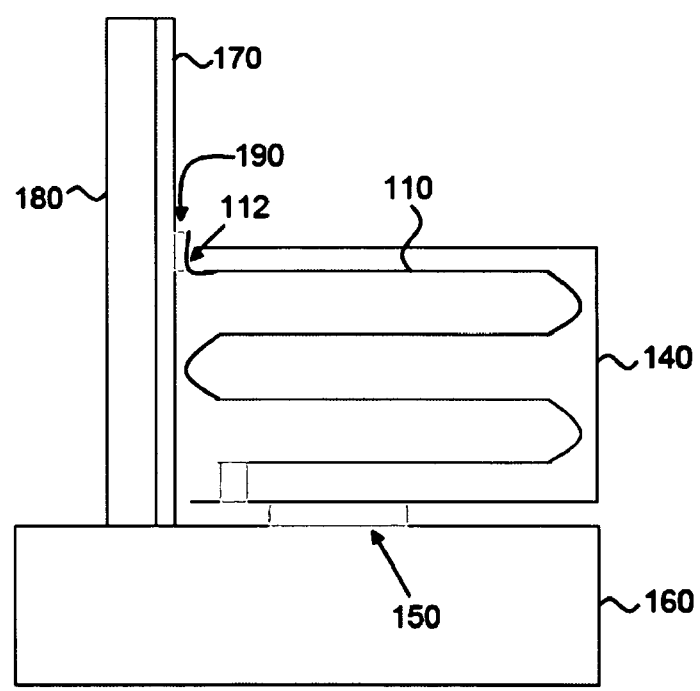

FIG. 1B shows an example of how blast-resistant window system 100 would be fit to a window and a frame or wall surrounding the window. FIG. 1B shows a side view of window 180, anchored in wall 160, and covered on the inside with protective film 170. (Only a small section of window 180 is shown, for clarity). The first end 112 of material 110 is bonded with bonding agent 190 to film 170. Any bonding agent known in the art may be used as bonding agent 190. In a preferred embodiment, first end 112 is bonded to a metal or plastic transition strip (not shown), and this transition strip is in turn bonded to film 170. In another preferred embodiment, a layer of Spectra felt and/or fabric (not shown) may be used in between first end 112 and film 170. This layer serves to reduce the stress concentration at the edge of the glass window 180. In a particularly preferred embodiment, this layer includes a layer of Spectra felt over a layer of strong Aramid woven fiber. This combination has been shown by others to greatly enhance protection against the fragments from a failed turbine engine by reducing the local stress concentrations from the edges of the fragments. If glass fragments cause materials 110 and 120 to fail at other locations away from the edge of the glass, the Spectra felt layer may be extended and enclosed with materials 110 and 120 inside cover 140.

Cover 140 is anchored to frame or wall 160 via anchoring means 150. Anchoring means 150 may be any anchoring means known in the art, including but not limited to various adhesives or a vulcanizing bonding process. The cover is preferably semi-rigid to permit the deployment of the blast-restraint system.

Figure 2:
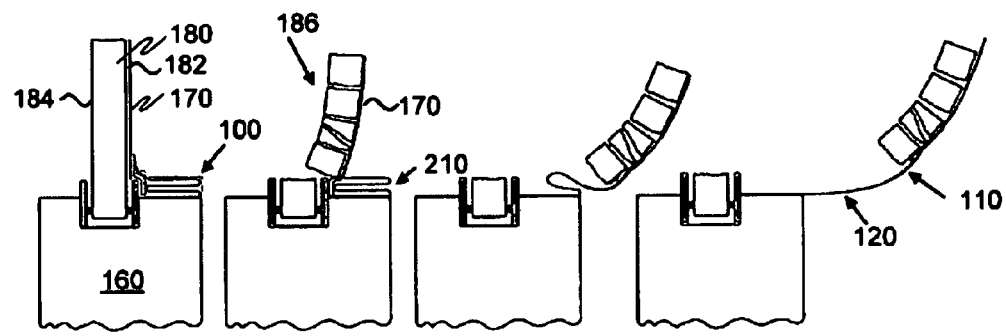
FIG. 2 shows a mechanism of action of a system according to the present invention.

Blast-resistant window system 100 is designed to respond to an explosive blast pressure impact as shown in FIG. 2. FIG. 2A shows a side view of system 100, which is bonded to film 170, which is in turn attached to the inner surface 182 of window 180. System 100 is also anchored to wall or frame 160. In FIG. 2B-D, pressure from an explosive blast hits the outside 184 of window 180. Sufficient blast loading will produce failure of the glass in window, such that it fragments into pieces 186. The film 170 and glass fragments 186 then translate, uncoil materials 110 and 120, and gradually stretch the elastomeric material until the elastomeric material arrests the glass and film (FIGS. 2C and D). The folds 210 in materials 110 and 120 may be lightly bonded to themselves so that they unfold as shown in FIG. 2.

This system has several advantages over those that use solely an elastomeric material or a non-elastomeric material. For a system using all non-elastomeric material, when the material reaches the limit of deployment, it must absorb any remaining blast pressure and bring the glass velocity down to zero fps. Thus, the material must be of sufficient strength such that when fully extended, it will bring the glass velocity down to zero fps. If only elastomeric material is used, the material necessary to bring the glass velocity to zero fps will be several times thicker than a version using only non-elastomeric material, which adds considerably more bulk to the restraint system and requires a much larger and obstructrive/obtrusive storage container around the window. In contrast, if both a non-elastomeric material and an elastomeric material are used, as in the inventive system, the strength requirement of the non-elastomeric material can be reduced, and the amount, and thus the total bulk, of the elastomeric material can be reduced. This allows the inventive system to bring the glass velocity down to zero fps and achieve the same degree of containment of the glass window fragments as single material systems, but with a significant reduction in size of the overall system. Preferably, the system according to the present invention contains window glass fragments resulting from an impact of an explosive blast pressure of at least about 4 psi, more preferably about 10 psi.

Figure 3:
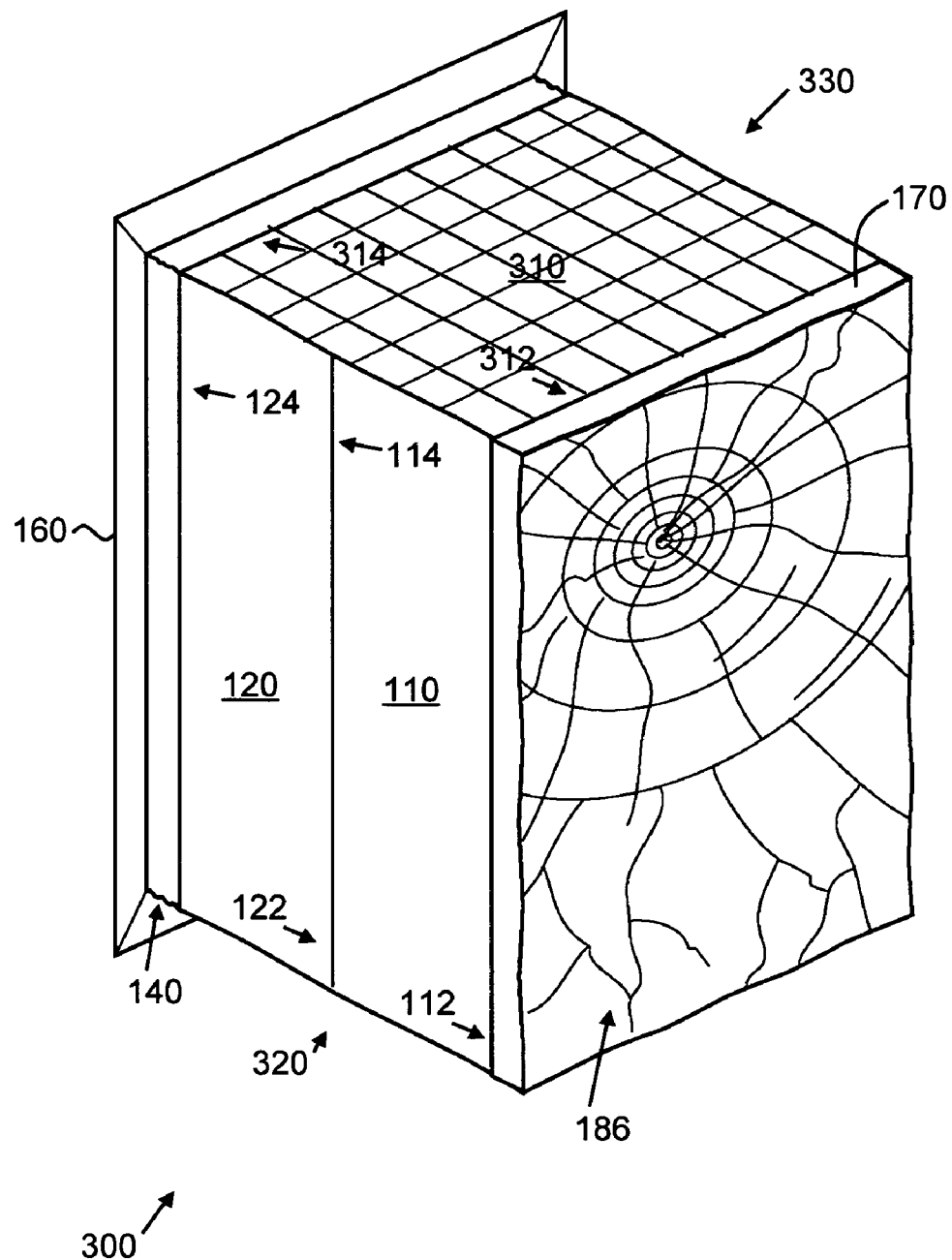
FIG. 3 shows another embodiment of a system according to the present invention.

FIG. 3 shows a frontal view of a preferred embodiment of a deployed blast-resistant window system 300 according to the present invention. System 300 includes two sides, a top, and a bottom (only one side 320 and a top 330 are shown for clarity). Each side contains a first material 110, with first end 112 and second end 114, and a second material 120, with first end 122 and second end 124. First material 110 is either elastomeric or non-elastomeric. Second material 120 is elastomeric when first material 110 is non-elastomeric, and is non-elastomeric when first material 110 is elastomeric. First material 110 is bonded through a bonding agent (not shown) at first end 112 to window film 170, which is attached to window fragments 186. First material 110 is bonded at second end 114 to first end 122 of second material 120. Second material 120 is anchored at its second end 124 to the inside of cover 140. The top and bottom of system 300 are made of third material 310, with first end 312 and second end 314. Third material 310 is anchored along its second end 314 to the inside of cover 140. Third material 310 is bonded with a bonding agent (not shown) along its first end 312 to film 170. In addition, cover 140 is anchored to wall or frame 160.

Preferably, third material 310 is non-elastomeric, and is made of at least one synthetic fabric, such as rayon or nylon. Third material 310 may be identical to, different to, or partially made of first or second non-elastomeric material. Preferably, all or part of third material 310 is a mesh, as indicated by the crossed lines in FIG. 3. Similar to first and second materials 110 and 120, third material 310 is preferably folded, rolled, or coiled within cover 140 prior to deployment.

Figure 4:
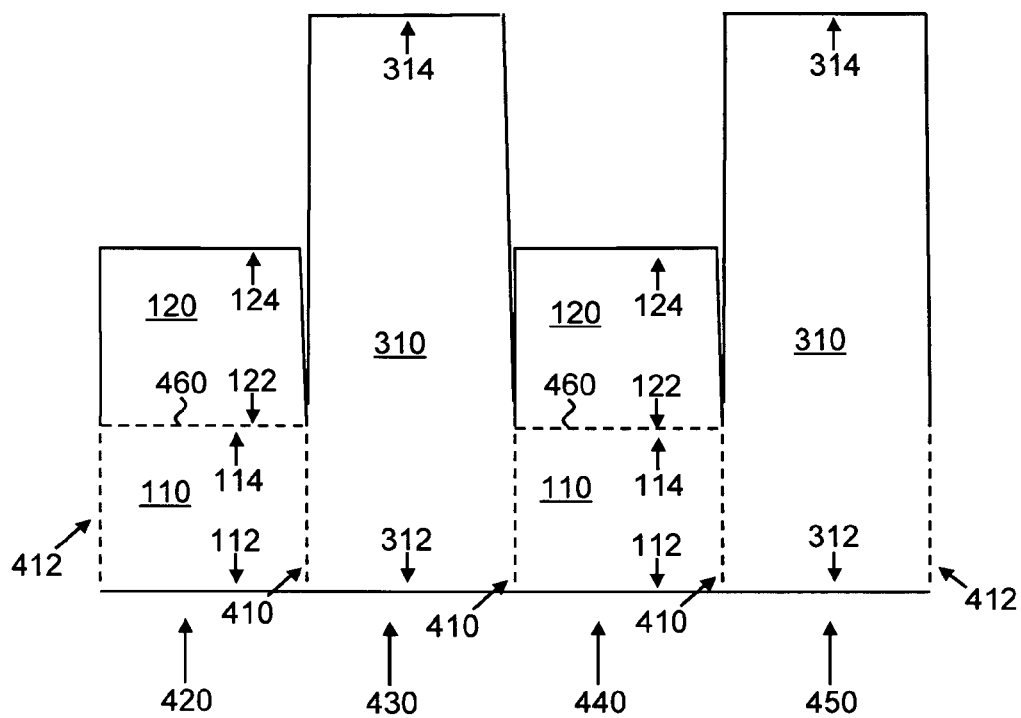
FIG. 4 shows an example of a material layout for a system according to the present invention.

FIG. 4 shows a preferred plan for assembling materials 110, 120, and 310 into a system according to the present invention. In this plan, 420 and 440 indicate side panels, 430 indicates a bottom panel, and 450 indicates a top panel. Side panels 420 and 440 are each made of first material 110, having first end 112 and second end 114, and second material 120, having first end 122 and second end 124. First material 110 is bonded 460 along its second end 114 to the first end 122 of second material 120. In addition, side panel 420 is bonded 410 to bottom panel 430, which is in turn bonded 410 to side panel 440, which is in turn bonded to top panel 450. Preferably, top panel 450 is also bonded 412 to side panel 420, forming a tunnel-like structure. Also preferably, it is the non-elastomeric material in side panels 420 and 440 that is bonded to top and bottom panels 430 and 450. While 110 is shown to be the non-elastomeric material in this figure, 120 could in fact be the non-elastomeric material. All materials may be bound using any method known in the art, including but not limited to sewing, gluing, or sewing and gluing. In an alternative embodiment, 420 and 440 are top and bottom panels, respectively, and 430 and 450 indicate side panels FIG. 5 shows an embodiment of the present invention in which the system has a top section 510, bottom section 520, (FIG. 5A) and two side sections 530 (FIG. 5B). The top section 510 is designed to bind at an edge 512 to a top border 172 of film 170, and at an edge 514 to a frame or wall 160 surrounding window 180. Bottom section 520 is designed to bind at an edge 522 to a bottom border 174 of film 170, and at an edge 524 to a frame or wall 160 surrounding window 180. Side sections 530 are designed to bind at an edge 532 to a side border 176 of film 170, and at an edge 534 to a frame or wall 160 surrounding window 180.

Also preferably, side sections 530 contain a cover and the first and second materials. In an alternative embodiment, top section 510 and bottom section 520 contain the first and second materials, and side sections 530 contain the third material.

Figure 6:
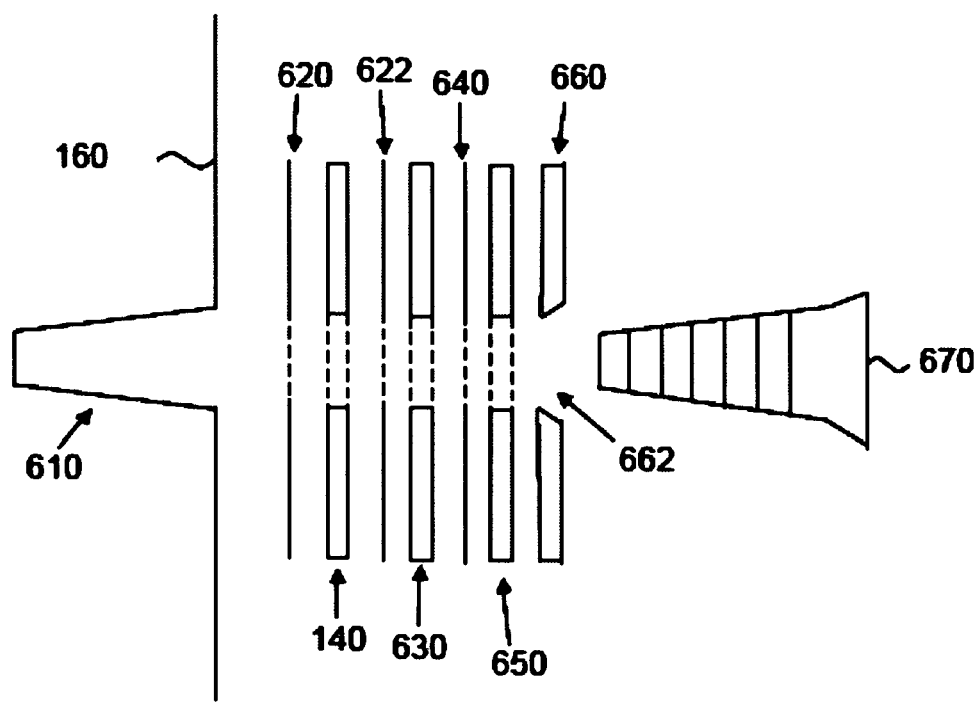
FIG. 6 shows examples of a means of anchoring a system according to the present invention to a wall or frame (A) and a means of binding a system according to the present invention to a window film.
Figure 6:
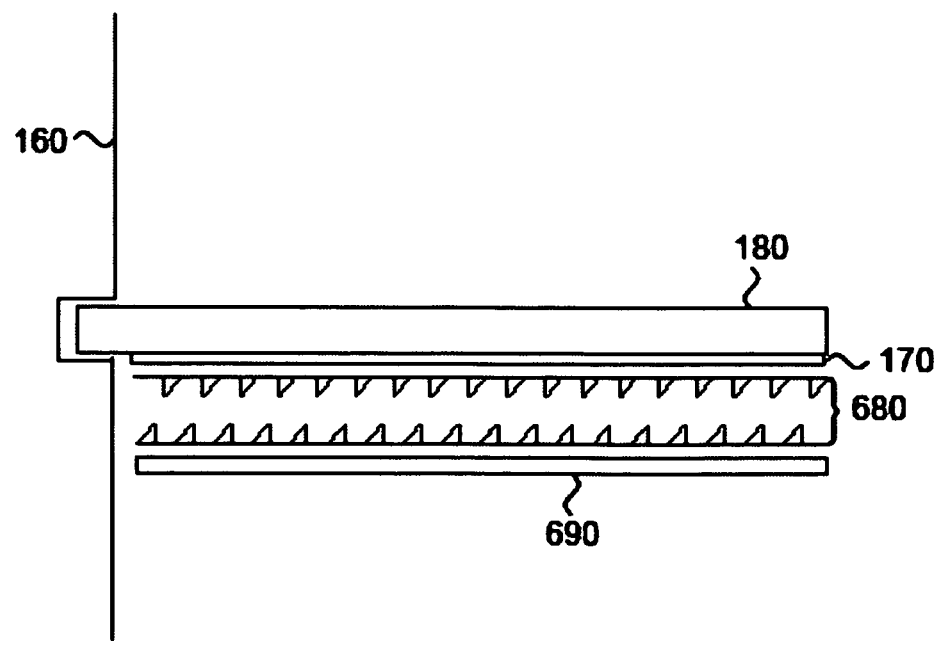

FIG. 6A shows an example of how a system according to the present invention could be anchored to a frame or wall surrounding a window. This example is illustrative only. Any anchoring means known in the art could be used to anchor the system to the frame or wall. FIG. 6A shows frame or wall 160 with indentation 610. Cover 140 is bonded on both sides by double-stick tape 620 and 622. Double-stick tape 622 is in turn bonded to reinforcing strip 630. Reinforcing strip 630 may be, e.g., plastic, aluminum, etc. Reinforcing strip 630 and material 650 are bonded with adhesive 640. In this case, material 650 would be either the second or third material. Material 650 is in turn bonded to a reinforcing strip 660 with counter-sink hole 662 to receive fastener 670. Fastener 670 may be a screw, bolt, etc., and goes through double stick tape 620 and 622, cover 140, reinforcing strip 630, adhesive 640, and material 650 where indicated by the dashed lines.

FIG. 6B shows an example of how a system according to the present invention is bonded to a window film. This example is illustrative only. Any bonding agent known in the art could be used to bond the system to the window film. FIG. 6B shows frame 160, holding window 180. Film 170 is attached to window 180 using any method known in the art. Material 690 is bonded to film 170 with adhesive backed Velcro 680. Material 690 is in this case the first or third material. Velcro 680 is preferably of the hook and loop sort.

EXAMPLES

1. We have performed a dynamic one-dimensional analysis of this approach, in which we represented the window and the first and second materials with a simple spring-mass system. The analysis shows that we can design window hardness to survive a wide range of blast loading. In particular, we can design a practical system for a 3-foot-wide by 4-foot-high ¼-inch-thick window that meets both levels of GSA hardness requirements (i.e. 4 psi and 10 psi). These two systems both use elastomeric material that has a maximum stress of 800 psi and maximum strain of 450%. In one example of a system designed to withstand 10 psi blast pressure, the elastomeric material was neoprene at 0.030 inch thick and 18 inches long (i.e., in the direction of deployment) with slits in the central 12 inches aligned in the direction of deployment. Hardness levels above 10 psi may also be obtained by adjusting the size of the elastomeric material size or by choosing a different type of elastomeric material.

2. An important feature of this invention is the attachment of the first material to the window film. In a preferred embodiment, we bonded both the film and the first material to a metal or plastic transition strip. To check the attachment strength, we performed static pull tests on an aluminum strip that had neoprene rubber bonded to one end and window film bonded to the other. For a two-inch overlap between the aluminum and the film, we performed a simple static test with no damage to the test specimen at 50 lb per inch; the actual strength appears to be much higher. The 10-psi design requires a bond strength of only 72 lb per inch.

3. To test the blast hardness of a window with a hybrid elastomeric/non-elastomeric containment system as described above, test windows were mounted in a rigid wall one foot from the end of an 8-ft-diameter, 257-ft-long explosively driven shock tube. The desired load is a peak pressure of at least 10 psi and an impulse of at least 89 psi-msec. We designed an explosive charge that would produce the desired load on the wall. The charge was made of 525 gms of C-4 explosive and is suspended on the axis of the tube 142 feet from the wall. A high speed video camera was positioned behind the wall and aimed at right angles to the axis of the tube. The performance of the window system was evaluated by the observations in the video record and by observing where the glass fragments ended up after the test. Pressure transducers were mounted adjacent to the test window to record the amplitude and duration of the test blast pressure wave at the surface of the window.

Figure 7:
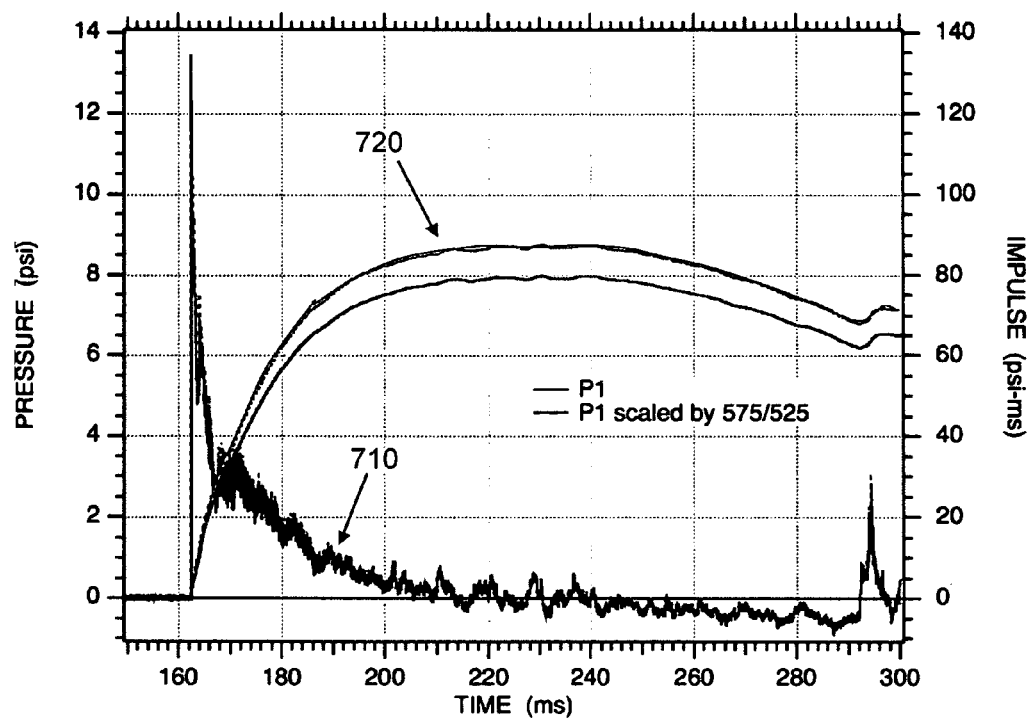
FIG. 7 shows blast pressure data from a test of a blast-resistant window system according to the present invention.

FIG. 7 represents blast pressure data from a test of a blast-hardened window. The actual peak pressure (indicated by a black line) of the blast at the surface of the window was about 9 psi when 525 grams of high explosive were used. The hybrid elastomeric/non-elastomeric system successfully contained glass fragments of the window at this blast pressure and duration. These data were extrapolated to the expected blast pressure forces if 575 grams of the same explosive were used. The extrapolated date resulted in a blast pressure of over 13 psi (grey line). The curves indicated by arrow 710 are the pressure data, and the curves indicated by arrow 720 are the impulse data. The hybrid elastomeric/non-elastomeric system successfully contained glass fragments of the window at this blast pressure and duration.

As one of ordinary skill in the art will appreciate, various changes, substitutions, and alterations could be made or otherwise implemented without departing from the principles of the present invention. For example, while the invention has been described with first and second materials on the sides, and third material on the top and bottom, the reverse could be true. Accordingly, the scope of the invention should be determined by the following claims and their legal equivalents.

What is claimed is:

1. A system for mitigating the release of window glass fragments by an explosive blast pressure impact, comprising:
   a. a first material, having first and second ends, wherein said first material is either elastomeric or non-elastomeric;
   b. a second material, having first and second ends, wherein said second material is elastomeric when said first material is non-elastomeric, and wherein said second material is non-elastomeric when said first material is elastomeric;
   c. a cover for protecting said first material and said second material, wherein said cover comprises fasteners, wherein said fasteners are positioned to connect said cover to a wall or window frame that is proximal to an end of a window film;
   d. a window film bonding agent connected to said first end of said first material, wherein said window film bonding agent is disposed to attach to a proximal end of said window film; and
   e. a third material, having first and second ends, wherein said third material is non-elastomeric, wherein said cover releases said first and second materials upon said pressure impact of said explosive blast, wherein said first material is bonded along its second end edge to said first end edge of said second material, and wherein said second material is anchored along its second end to an inside of said cover.

2. The system as set forth in claim 1, wherein said third material is anchored along its second end to said inside of said cover.

3. The system as set forth in claim 1, wherein said third material comprises at least one synthetic fabric.

4. The system as set forth in claim 1, wherein said third material comprises at least one of nylon or rayon.

5. The system as set forth in claim 1, wherein said third material comprises a mesh.

6. The system as set forth in claim 1, wherein said first, second, and third materials are folded, rolled, or coiled within said cover.

7. The system as set forth in claim 1, wherein said system has a top section, a bottom section, and two side sections, wherein said top section is designed to bind at one edge to a top border of a film, wherein said bottom section is designed to bind at one edge to a bottom border of said film, and wherein each of said two side sections is designed to bind at one edge to a side border of said film, and wherein another edge of said top, said bottom, and said two side sections is designed to anchor to said frame or said wall.

8. The system as set forth in claim 7, wherein said top and bottom sections contain said third material and wherein said side sections contain said first and second materials.

9. The system as set forth in claim 1, wherein an edge of said first or second non-elastomeric material is bonded to an edge of said third material.

10. The system as set forth in claim 1, further comprising a bonding agent for bonding said third material along its first end to a film attached to an inner surface of a window.

11. A system for mitigating the release of window glass fragments by an explosive blast pressure impact, comprising:
   a. a first material, having first and second ends, wherein said first material is either elastomeric or non-elastomeric;
   b. a second material, having first and second ends, wherein said second material is elastomeric when said first material is non-elastomeric, and wherein said second material is non-elastomeric when said first material is elastomeric;
   c. a cover for protecting said first material and said second material, wherein said cover comprises fasteners, wherein said fasteners are positioned to connect said cover to a wall or window frame that is proximal to an end of a window film; and
   d. a window film bonding agent connected to said first end of said first material, wherein said window film bonding agent is disposed to attach to a proximal end of said window film, wherein said cover releases said first and second materials upon said pressure impact of said explosive blast, wherein said first material is bonded along its second end edge to said first end edge of said second material, and wherein said second material is anchored along its second end to an inside of said cover, wherein said non-elastomeric material comprises a synthetic fabric.

12. A system for mitigating the release of window glass fragments by an explosive blast pressure impact, comprising:
   a. a first material, having first and second ends, wherein said first material is either elastomeric or non-elastomeric;
   b. a second material, having first and second ends, wherein said second material is elastomeric when said first material is non-elastomeric, and wherein said second material is non-elastomeric when said first material is elastomeric;
   c. a cover for protecting said first material and said second material, wherein said cover comprises fasteners, wherein said fasteners are positioned to connect said cover to a wall or window frame that is proximal to an end of a window film; and
   d. a window film bonding agent connected to said first end of said first material, wherein said window film bonding agent is disposed to attach to a proximal end of said window film, wherein said cover releases said first and second materials upon said pressure impact of said explosive blast, wherein said first material is bonded along its second end edge to said first end edge of said second material, and wherein said second material is anchored along its second end to an inside of said cover, wherein said non-elastomeric material comprises nylon or rayon.

13. A system for mitigating the release of window glass fragments by an explosive blast pressure impact, comprising:
   a. a first material, having first and second ends, wherein said first material is either elastomeric or non-elastomeric;
   b. a second material, having first and second ends, wherein said second material is elastomeric when said first material is non-elastomeric, and wherein said second material is non-elastomeric when said first material is elastomeric;
   c. a cover for protecting said first material and said second material, wherein said cover comprises fasteners, wherein said fasteners are positioned to connect said cover to a wall or window frame that is proximal to an end of a window film; and
   d. a window film bonding agent connected to said first end of said first material, wherein said window film bonding agent is disposed to attach to a proximal end of said window film, wherein said cover releases said first and second materials upon said pressure impact of said explosive blast, wherein said first material is bonded along its second end edge to said first end edge of said second material, and wherein said second material is anchored along its second end to an inside of said cover, wherein said elastomeric material is selected from the group consisting of nitrile, butyl, epichlorohydrin, hypalon, latex, natural rubber, neoprene, polyurethane, pure gum rubber, styrene butadiene, santoprene, vinyl, and viton.

14. A system for mitigating the release of window glass fragments by an explosive blast pressure impact, comprising:
   a. a first material, having first and second ends, wherein said first material is either elastomeric or non-elastomeric;
   b. a second material, having first and second ends, wherein said second material is elastomeric when said first material is non-elastomeric, and wherein said second material is non-elastomeric when said first material is elastomeric;
   c. a cover for protecting said first material and said second material, wherein said cover comprises fasteners, wherein said fasteners are positioned to connect said cover to a wall or window frame that is proximal to an end of a window film; and
   d. a window film bonding agent connected to said first end of said first material, wherein said window film bonding agent is disposed to attach to a proximal end of said window film, wherein said cover releases said first and second materials upon said pressure impact of said explosive blast, wherein said first material is bonded along its second end edge to said first end edge of said second material, and wherein said second material is anchored along its second end to an inside of said cover, wherein said elastomeric material contains slits to reduce the effective thickness of said elastomeric material.

15. A system for mitigating the release of window glass fragments by an explosive blast pressure impact, comprising:
   a. a first material, having first and second ends, wherein said first material is either elastomeric or non-elastomeric;
   b. a second material, having first and second ends, wherein said second material is elastomeric when said first material is non-elastomeric, and wherein said second material is non-elastomeric when said first material is elastomeric;
   c. a cover for protecting said first material and said second material, wherein said cover comprises fasteners, wherein said fasteners are positioned to connect said cover to a wall or window frame that is proximal to an end of a window film; and
   d. a window film bonding agent connected to said first end of said first material, wherein said window film bonding agent is disposed to attach to a proximal end of said window film, wherein said cover releases said first and second materials upon said pressure impact of said explosive blast, wherein said first material is bonded along its second end edge to said first end edge of said second material, and wherein said second material is anchored along its second end to an inside of said cover, wherein said bonding agent bonds said first material along its first end to a film attached to an inner surface of a window.

16. A system for mitigating the release of window glass fragments by an explosive blast pressure impact, comprising:
   a. a first material, having first and second ends, wherein said first material is either elastomeric or non-elastomeric;
   b. a second material, having first and second ends, wherein said second material is elastomeric when said first material is non-elastomeric, and wherein said second material is non-elastomeric when said first material is elastomeric;
   c. a cover for protecting said first material and said second material, wherein said cover comprises fasteners, wherein said fasteners are positioned to connect said cover to a wall or window frame that is proximal to an end of a window film; and
   d. a window film bonding agent connected to said first end of said first material, wherein said window film bonding agent is disposed to attach to a proximal end of said window film, wherein said cover releases said first and second materials upon said pressure impact of said explosive blast, wherein said first material is bonded along its second end edge to said first end edge of said second material, and wherein said second material is anchored along its second end to an inside of said cover, wherein said system contains said window glass fragments resulting from said explosive blast pressure impact when said blast exerts a pressure of at least about 4 psi.

17. A system for mitigating the release of window glass fragments by an explosive blast pressure impact, comprising:
   a. a first material, having first and second ends, wherein said first material is either elastomeric or non-elastomeric;
   b. a second material, having first and second ends, wherein said second material is elastomeric when said first material is non-elastomeric, and wherein said second material is non-elastomeric when said first material is elastomeric;
   c. a cover for protecting said first material and said second material, wherein said cover comprises fasteners, wherein said fasteners are positioned to connect said cover to a wall or window frame that is proximal to an end of a window film; and
   d. a window film bonding agent connected to said first end of said first material, wherein said window film bonding agent is disposed to attach to a proximal end of said window film, wherein said cover releases said first and second materials upon said pressure impact of said explosive blast, wherein said first material is bonded along its second end edge to said first end edge of said second material, and wherein said second material is anchored along its second end to an inside of said cover, wherein said system contains said window glass fragments resulting from said explosive blast pressure impact when said blast exerts a pressure of about 10 psi.

* * * * *